(12) United States Patent  
Hirschman et al.

(10) Patent No.: US 9,049,590 B1  
(45) Date of Patent: Jun. 2, 2015

(54) COMMUNICATION USAGE CONTROL FOR A GROUP OF USERS

(71) Applicant: Sprint Communications Company L.P., Overland Park, KS (US)

(72) Inventors: Charles Brent Hirschman, Overland Park, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/151,512

(22) Filed: Jan. 9, 2014

(51) Int. Cl.
| | | |
|---|---|---|
| *H04M 11/00* | (2006.01) | |
| *H04W 4/26* | (2009.01) | |
| *H04W 72/04* | (2009.01) | |

(52) U.S. Cl.
CPC ............ *H04W 4/26* (2013.01); *H04W 72/0493* (2013.01)

(58) Field of Classification Search
CPC ............ H04M 2215/32; H04M 15/00; H04M 2215/2026; H04M 17/00; H04M 2207/18; H04W 4/24; H04W 4/02; H04W 8/18; H04W 4/16; H04W 92/02; H04W 76/02; H04W 8/26; H04W 88/06; H04L 29/08108; G06Q 30/02
USPC ........................ 455/405–406, 410, 411, 452.2
See application file for complete search history.

(56) References Cited

U.S. PATENT DOCUMENTS

| | | | |
|---|---|---|---|
| 7,457,609 B2 | 11/2008 | Cai | |
| 8,185,127 B1* | 5/2012 | Cai et al. ..................... | 455/452.2 |
| 2006/0168275 A1* | 7/2006 | Lin et al. ........................ | 709/230 |
| 2012/0101952 A1* | 4/2012 | Raleigh et al. ................ | 705/304 |
| 2013/0084826 A1 | 4/2013 | Mo et al. | |
| 2014/0038559 A1* | 2/2014 | Lehane .......................... | 455/411 |

* cited by examiner

*Primary Examiner* — Kashif Siddiqui (57) ABSTRACT

In a communication system, a control server determines a first quota for a rating group to grant communication usage on a per-user basis and indicates the first quota to a network element. The network element grants communication usage to the users in the rating group based on the first quota. A user communication device receives a user input indicating a user priority and transfers the user priority to the network element. The network element transfers the user priority to the control server. The control server processes the user priority to determine a second quota for the rating group. The network element receives the second quota and grants subsequent communication usage to the users in the rating group based on the second quota.

20 Claims, 10 Drawing Sheets

GRAPICAL MENU 700

RATING GROUP: 1034842

NOTICE: JANE DOE HAS CRITICALLY LOW RESOURCES UNTIL 10/1/2015

| USERS | PRIORITY |
|---|---|
| JANE DOE | 1 |
| JOHN DOE | 2 |
| MARY SMITH | 7 |
| JOE SMITH | 10 |

| SERVICES | PRIORITY |
|---|---|
| VOICE CALLS | 2 |
| VIDEO CALLS | 4 |
| AUDIO STREAM | 6 |
| VIDEO STREAM | 10 |
| EMAIL | 1 |
| VPN | 3 |
| WEB ACCESS | 5 |

| LOCATIONS (USER) | PRIORITY |
|---|---|
| HOME (ALL) | 1 |
| WORK (JANE) | 2 |
| WORK (JOHN) | 3 |
| SCHOOL (MARY) | 8 |
| SCHOOL (JOE) | 9 |

| DEVICES (USER) | PRIORITY |
|---|---|
| PHONE (JANE) | 1 |
| TABLET (JANE) | 2 |
| PHONE (JOHN) | 3 |
| LAPTOP(JOHN) | 3 |
| PHONE (MARY) | 5 |
| AUTO (MARY) | 4 |
| PHONE (JOE) | 9 |

SUBMIT

COMMUNICATION USAGE CONTROL FOR A GROUP OF USERS

TECHNICAL BACKGROUND

A wireless communication user may operate multiple devices under a single communication account to obtain various different communication services. These different services include email, video, audio, web access, and the like. A group of these communication users may share a single communication account. In either case, the communication service provider uses the communication account as a mechanism to receive compensation in exchange for corresponding services rendered.

To track communication usage in these multiple user/device environments, new communication tracking systems have been developed. Aspects of these systems are described in communication standards, such as Internet Engineering Task Force (IETF) Request For Comment (RFC) 3588, IETF RFC 4006, and the 3$^{rd}$ Generation Partnership Project (3GPP) Technical Specification (TS) 32.299. These standards use the terms "quota" and "rating group" to describe an amount of communication resources (quota) that are allocated to a group of users sharing an account (rating group).

Unfortunately, the newer communication tracking systems are not yet effective enough to control multiple user/device rating groups in an efficient manner. In particular, the ability of the user to dynamically prioritize users, devices, and services for these type of rating groups is severely lacking.

TECHNICAL OVERVIEW

In a communication system, a control server determines a first quota for a rating group to grant communication usage on a per-user basis and indicates the first quota to a network element. The network element grants communication usage to the users in the rating group based on the first quota. A user communication device receives a user input indicating a user priority and transfers the user priority to the network element. The network element transfers the user priority to the control server. The control server processes the user priority to determine a second quota for the rating group. The network element receives the second quota and grants subsequent communication usage to the users in the rating group based on the second quota.

DETAILED DESCRIPTION

Figure 1:
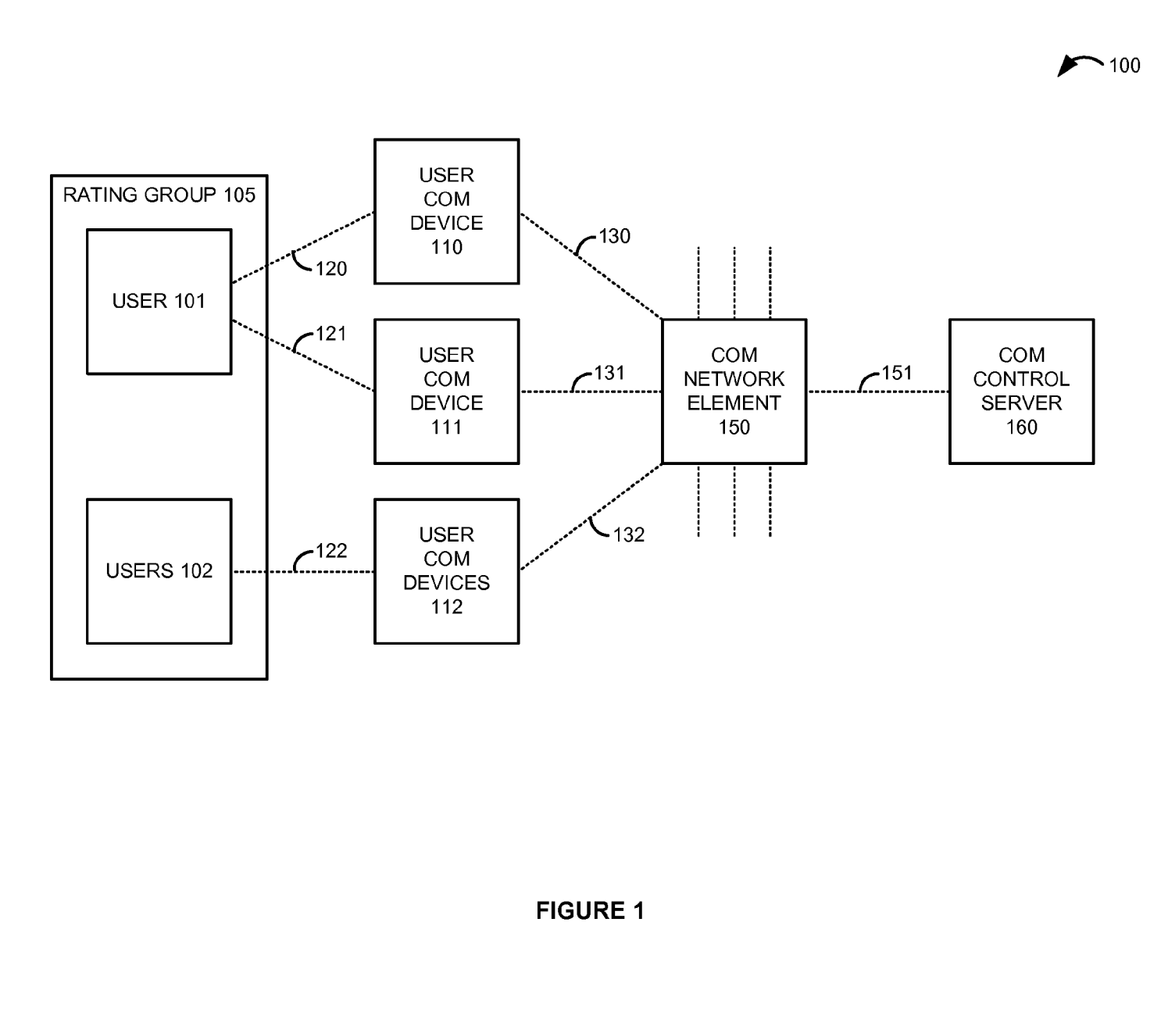
FIG. 1 illustrates a communication system to control communication usage among a group of users that comprise a rating group.

FIG. 1 illustrates communication system 100 to control communication usage among a group of users 101-102 that comprise rating group 105. Communication system 100 includes user communication devices 110-112, communication network element 150, and control server 160. User 101 provides inputs 120-121 to the user's respective communication devices 110-111. In a like manner, other users 102 provide inputs 122 to their respective communication devices 112. User communication devices 110-112 and communication network element 150 communicate over respective communication links 130-132. Communication network element 150 and communication control server 160 communicate over communication link 151. Although not shown for clarity, communication network element 150 is typically coupled to various other network elements and systems to support communication services for users 101-102.

User communication device 101 might be a computer, phone, media player, wireless transceiver, or some other user apparatus having a user interface and communication components. Communication network element 150 might be a packet gateway, policy server, base station, router, or some other computerized data communication platform. Communication control server 160 might comprise an on-line charging system, Authentication Authorization and Accounting (AAA) system, transactional billing system, or some other computerized communication usage tracking system.

In operation, communication control server 150 determines a first quota for rating group 105 to grant communication usage on a per-user basis within rating group 105. The first quota represents a set of software rules executed by communication network element 150 to generate communication usage grants for individual users 101-102. Communication control server 160 transfers a message indicating the first quota to communication network element 150 over link 151. Communication network element 150 receives the message with the first quota. In response, communication network element 150 grants communication usage on an individual basis to users 101-102 in rating group 105 based on the first quota.

For example, one of users 102 may operate one of user communication devices 112 to stream a video from a packet network, such as the Internet. In response, user communication device 112 requests communication service to support the video streaming from network element 150. Communication network element 150 would allow or dis-allow the video download based on the first quota. The first quota indicates how much communication usage may be granted to individual users 101-102 in rating group 105. In some examples, the first quota may also indicate how much communication usage may be granted to individual users 101-102 on a per-service, per-device, and/or per-location basis.

User communication device 110 receives user input 120 indicating a user priority. Although the user priority could vary, the priority may be an instruction to transfer communication resources from other users 102 to user 101 or from other user communication devices 111-112 to user communication device 110. In response to user input 120, user communication device 110 transfers a user instruction indicating the user priority to communication network element 150 over link 130. Communication network element 150 receives the user instruction and responsively transfers a user request indicating the user priority to communication control server 160 over link 151.

Communication control server 160 receives and processes the user request to determine a second quota for rating group 105 based on the user priority. The second quota will control the grants of subsequent communication usage on the per-user basis within rating group 105. Thus, the second quota represents a new set of software rules executed by communication network element 150 to generate communication usage grants for individual users 101-102. In some examples, the second quota may have augmented communication resources for user 101 and/or user communication device 110 that were transferred from other users 102 and/or other user communication devices 111-112. In some examples, the second quota may also indicate how much communication usage may be granted to individual users 101-102 on a per-user, per-service, per-device, and/or per-location basis.

Communication control server 160 transfers a user answer indicating the second quota to the communication network element 150 over link 151. Communication network element 150 receives the user answer and grants the subsequent communication usage to users 101-102 in rating group 105 based on the second quota. For example, user 101 may operate user communication device 110 for an email session. In response, user communication device 110 requests communication service to support the email session from network element 150. Communication network element 150 would allow or not allow the email session based on the second quota. If user 101 has augmented communication resources in the second quota, then the email session should successful. Note that other services for other users 102 and/or other user communication devices 111-112 may receive fewer communication resources to achieve the successful email session for user 101.

Note how user 101 operated user communication device 110 to obtain communication service under a new second quota for rating group 105. In some examples, the second quota has a shift of communication resources from users 102 to user 101 (although user 101 may shift communication resources to other users/devices in other examples). In some examples, the user priority may be selected from a graphical menu that indicates individual users, user communication devices, communication services, geographic areas, and the like. Combinations of priorities could be also identified in some examples. Thus, user 110 may control the re-allocation of communication resources within rating group 105 by indicating one or more user priorities.

In some examples, communication control server 150 determines a communication problem for rating group 105, such as a low amount of communication resources remaining for the group or an individual user, device, service, or location. In response, communication control server 150 transfers an alert indicating the problem to communication network element 150 over link 151. Communication network element 150 receives the alert and responsively transfers a notice of the problem to user communication device 110. If desired, the alert could be provided to other users and/or devices. User communication device 110 receives and presents the notice to user 101. Device 110 may display a graphic menu to select among various user priorities.

Figure 2:
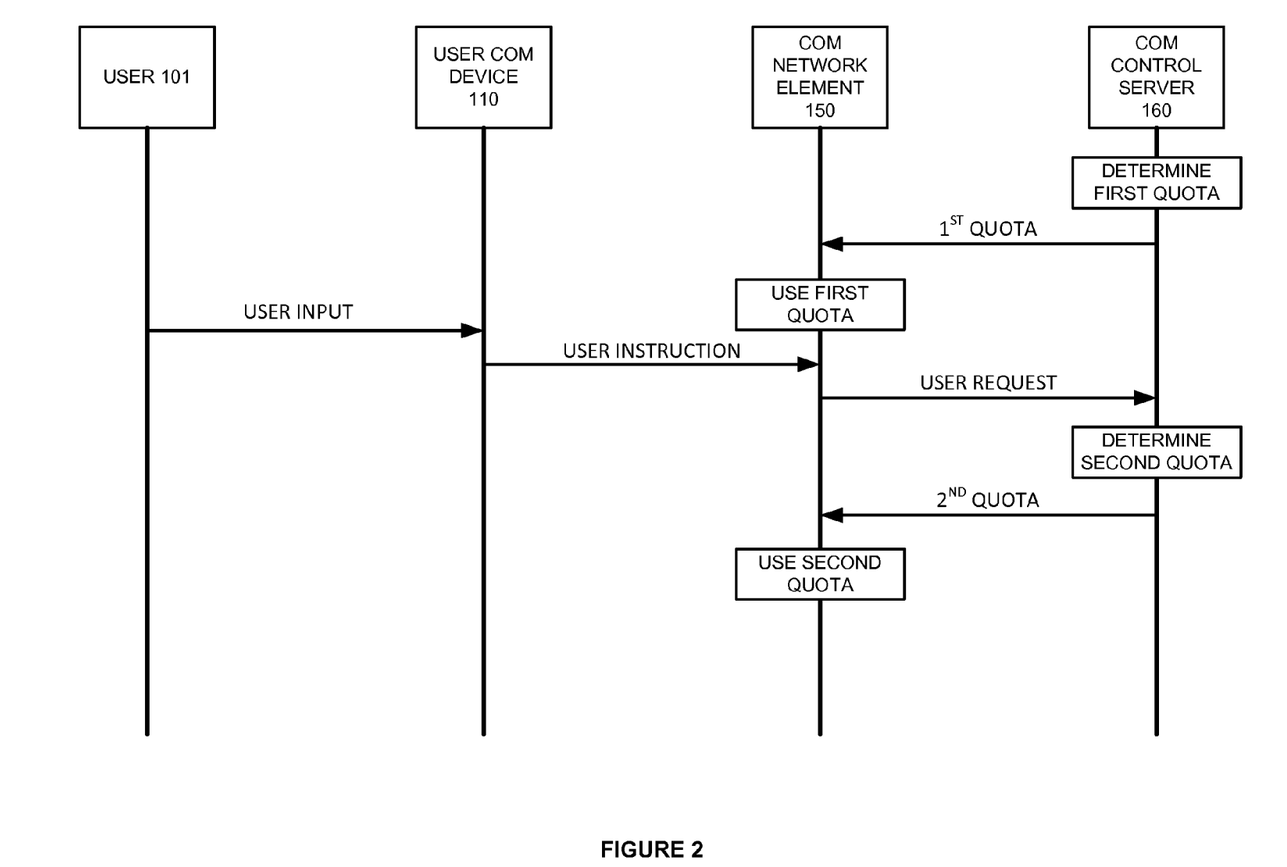
FIG. 2 illustrates the operation of a communication system to control communication usage among a group of users that comprise a rating group.

FIG. 2 illustrates the operation of communication system 100 to control communication usage among a group of users 101-102 that comprise rating group 105. Communication control server 150 determines a first quota for rating group 105 to grant communication usage on a per-user basis within rating group 105. Communication control server 160 transfers a message indicating the first quota to communication network element 150. In response, communication network element 150 grants communication usage on an individual basis to users 101-102 in rating group 105 based on the first quota. In some examples, the first quota also indicates how much communication usage may be granted to individual users 101-102 on per-user, a per-service, per-device, and/or per-location basis.

User communication device 110 receives user input 120 indicating a user priority. The user priority may require a transfer of communication resources within rating group 105 based on the user, service, device, and/or location. In response to user input 120, user communication device 110 transfers a user instruction indicating the user priority to communication network element 150. Communication network element 150 receives the user instruction and responsively transfers a user request indicating the user priority to communication control server 160.

Communication control server 160 processes the user request to determine a second quota for rating group 105 based on the user priority. The second quota will control the grants of subsequent communication usage on the per-user basis within rating group 105. In some examples, the second quota may have augmented communication resources for user 101 and/or user communication device 110 that were transferred from other users 102 and/or other user communication devices 111-112. In some examples, the second quota may also indicate how much communication usage may be granted to individual users 101-102 on a per-service, per-device, and/or per-location basis.

Communication control server 160 transfers a user answer indicating the second quota to the communication network element 150. Communication network element 150 grants subsequent communication usage to users 101-102 in rating group 105 based on the second quota. For example, user 101 may operate user communication device 110 for an email session which is successfully completed under the second quota even though communication resources for rating group 105 were nearly exhausted. User 101 controls the re-allocation of communication resources within rating group 105 by indicating user priorities.

Figure 3:
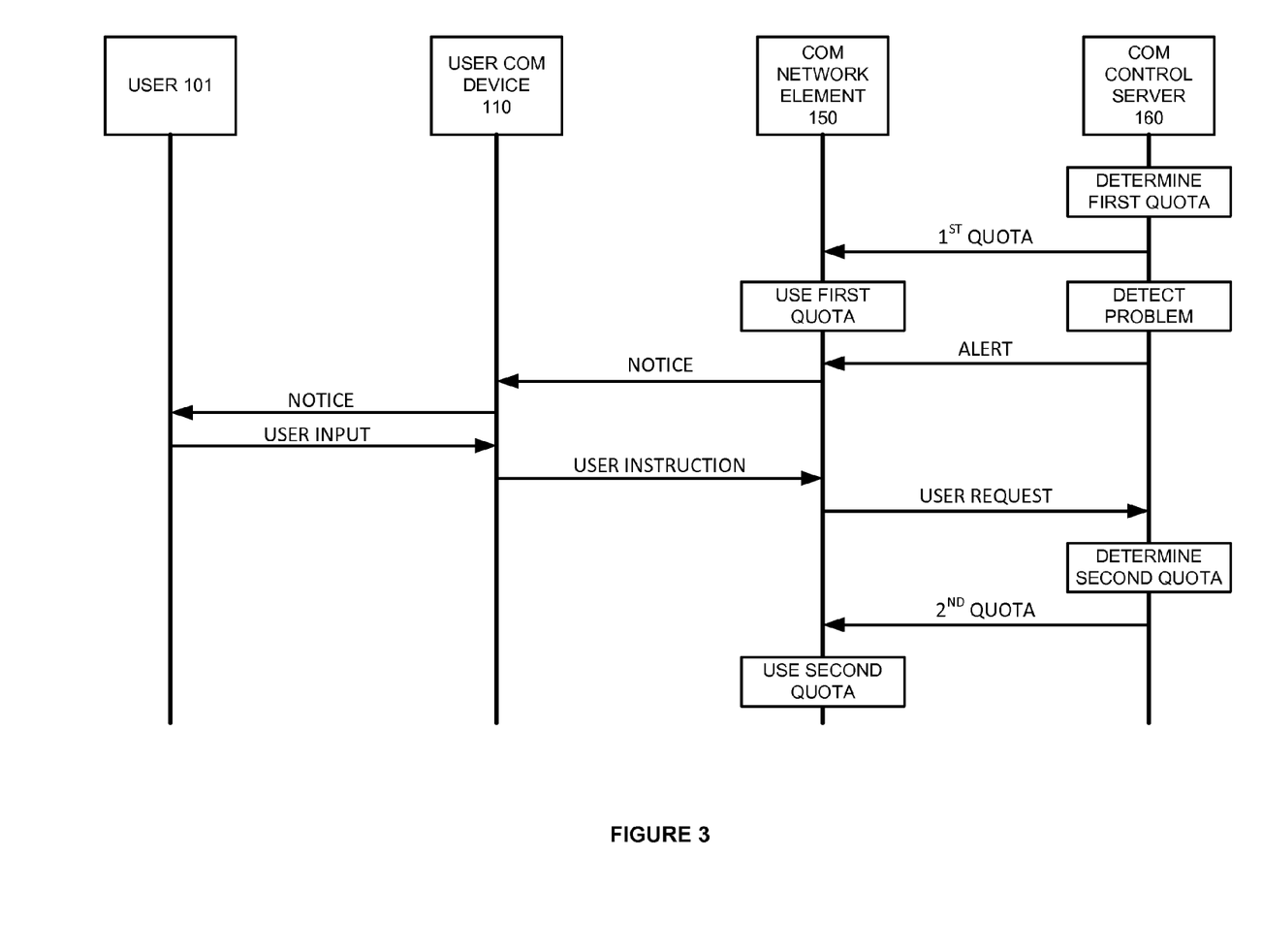
FIG. 3 illustrates an optional operation of a communication system to control communication usage among a group of users that comprise a rating group.

FIG. 3 illustrates an optional operation of communication system 100 to control communication usage among a group of users 101-102 that comprise rating group 105. Communication control server 160 determines a first quota for rating group 105 to grant communication usage on a per-user basis within rating group 105. Communication control server 160 transfers a message indicating the first quota to communication network element 150. In response, communication network element 150 grants communication usage on an individual basis to users 101-102 in rating group 105 based on the first quota.

Communication control server 160 determines a communication problem for rating group 105, such as a low amount of communication resources remaining for the group or an individual user, device, service, or location. In response, communication control server 160 transfers an alert indicating the problem to communication network element 150. Communication network element 150 receives the alert and responsively transfers a notice of the problem to user communication device 110. The notice may also be provided to other users and/or devices. User communication device 110 presents the notice to user 101. To present the notice, device 110 may display a graphic menu to select among various user priorities.

User communication device 110 receives user input 120 indicating a user priority. The user priority may require a transfer of communication resources within rating group 105 based on the user, service, device, and/or location. In response to user input 120, user communication device 110 transfers a user instruction indicating the user priority to communication network element 150. Communication network element 150 receives the user instruction and responsively transfers a user request indicating the user priority to communication control server 160.

Communication control server 160 processes the user request to determine a second quota for rating group 105 based on the user priority. The second quota will control the grants of subsequent communication usage on the per-user basis within rating group 105. In some examples, the second quota may have augmented communication resources for user 101 and/or user communication device 110 that were transferred from other users 102 and/or other user communication devices 111-112. In some examples, the second quota may also indicate how much communication usage may be granted to individual users 101-102 on a per-service, per-device, and/or per-location basis.

Communication control server 160 transfers a user answer indicating the second quota to the communication network element 150. Communication network element 150 grants subsequent communication usage to users 101-102 in rating group 105 based on the second quota. For example, user 101 may operate user communication device 110 for an email session that is successfully completed under the second quota even though communication resources for rating group 105 were nearly exhausted. User 110 controls the re-allocation of communication resources within rating group 105 by indicating user priorities.

Figure 4:
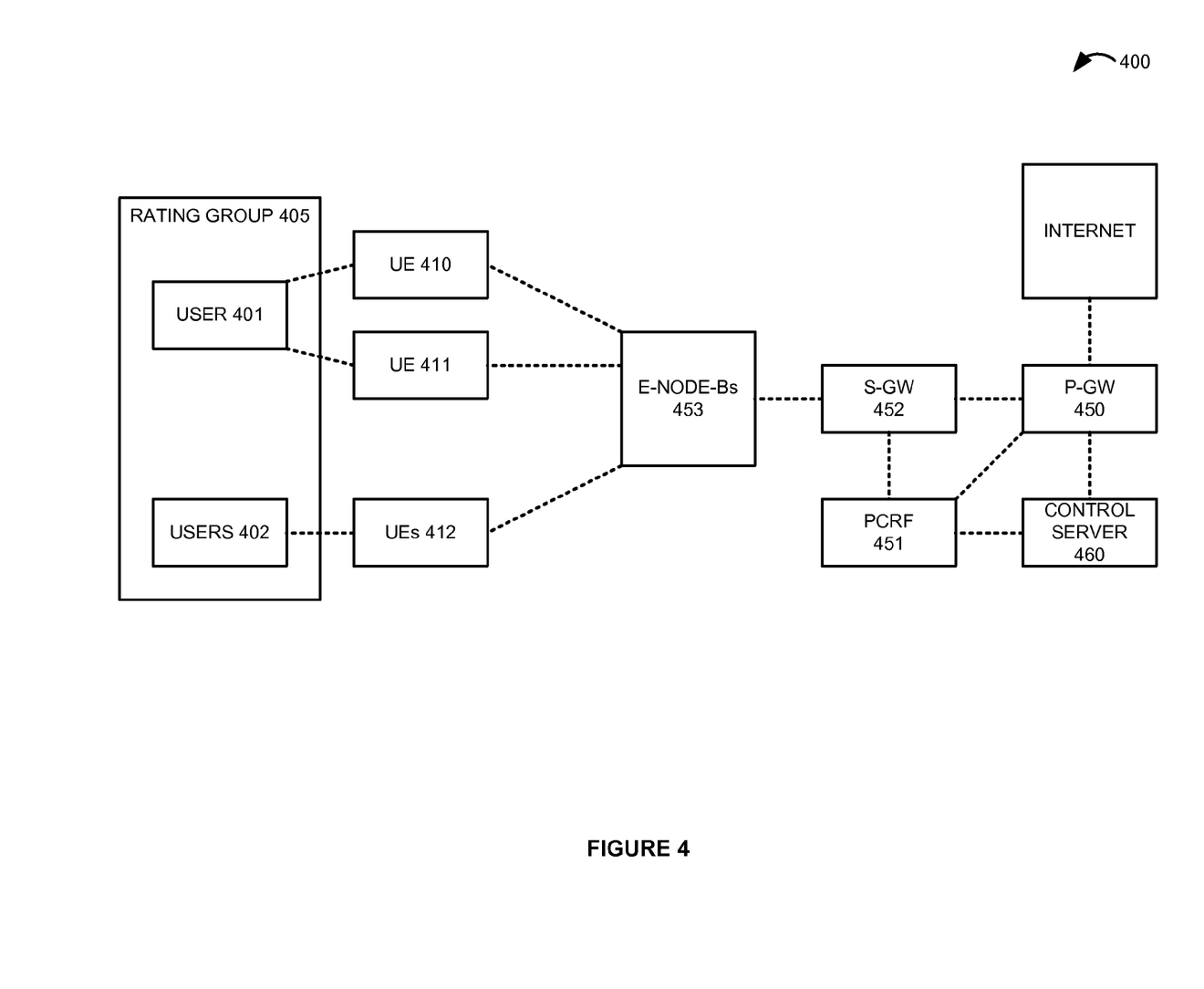
FIG. 4 illustrates a Long Term Evolution (LTE) network to control communication usage among a group of users that comprise a rating group.

FIG. 4 illustrates a Long Term Evolution (LTE) network 400 to control communication usage among a group of users 401-402 that comprise rating group 405. LTE network 400 includes User Equipment (UE) 410-412, Packet Gateway (P-GW) 450, Policy Control and Rules Function (PCRF) 451, Service Gateway (S-GW) 452, eNodeBs 453, and communication control server 460. UEs 410-412, P-GW 450, and control server 460 illustrate respective examples of user communication devices 110-112, network element 150, and control server 160, although these devices and systems of FIG. 1 may use alternative configurations and operations in other examples.

Figure 5:
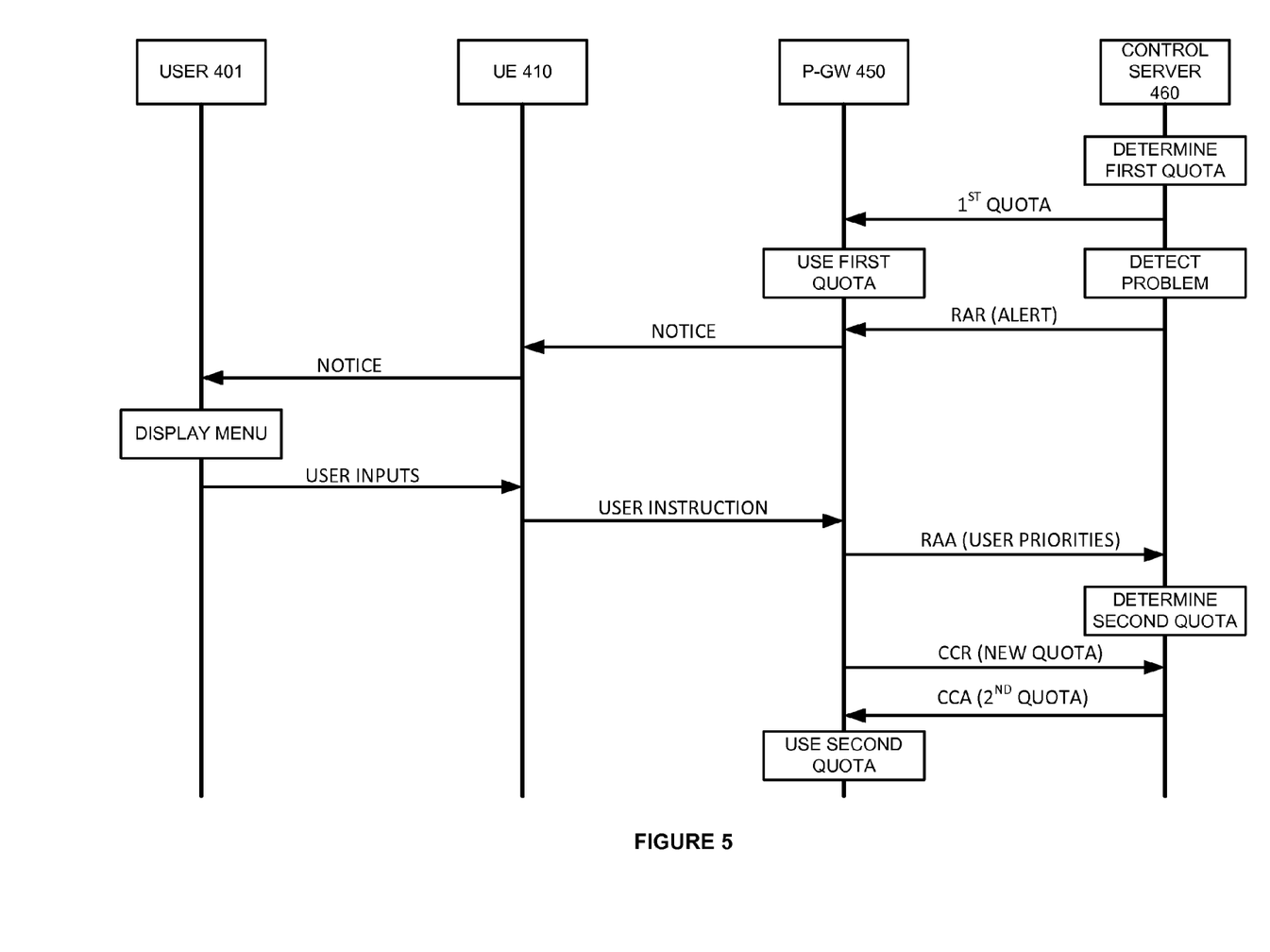
FIG. 5 illustrates the operation of the LTE network to control communication usage among a group of users that comprise a rating group.

FIG. 5 illustrates an exemplary operation of LTE network 400 to control communication usage among users 401-402 in rating group 405. Communication control server 460 determines a first quota for rating group 405 and transfers a message indicating the first quota to P-GW 450. In response, P-GW 450 provides communication usage on an individual basis to users 401-402 in rating group 405 based on the first quota.

Communication control server 450 determines a communication problem for rating group 405, such as a low amount of communication resources remaining for the group. In response, communication control server 450 transfers a Re-Authorization Request (RAR) indicating the problem to P-GW 450. P-GW 450 receives the RAR and responsively transfers a notice of the problem to UE 410 for display to user 401. This user notice may be provided to other users and/or devices as desired. UE 410 presents the notice to user 401 indicating the problem. UE 410 also displays a graphic menu to select one or more user priorities.

Responsive to the graphical menu, UE 410 receives user inputs indicating user priorities. The user priorities may require a transfer of communication resources within rating group 405 based on the user-selected priorities for the users, services, devices, and/or locations. UE 410 transfers a user instruction indicating the user priority to P-GW 450. P-GW 450 receives the user instruction and responsively transfers a Re-Authorization Answer (RAA) indicating the user priority to control server 460. Note that RAR/RAA timers could be adjusted to account for user interaction time.

In alternative examples, the interaction between user 401, UE 410, and P-GW 450 to obtain the user priorities may occur before communication control server 460 sends the RAR, so P-GW 450 can promptly respond with the RAA having user priorities. In these examples, user 401 may be unaware of any problems when they set their user priorities.

Communication control server 460 processes user priorities from the RAA to determine a second quota for rating group 405 based on the user priorities. The second quota controls the grants of subsequent communication usage on the per-user basis within rating group 405. In some examples, the second quota also indicates how much communication usage will be granted to individual users 401-402 on a per-service, per-device, and per-location basis. In response to transferring the RAA, P-GW 450 also transfers a Credit Control Request (CCR) to communication control server 460. Communication control server 460 returns a Credit Control Answer (CCA) indicating the second quota. P-GW 450 then grants subsequent communication usage to users 401-402 in rating group 405 based on the second quota in the CCA.

Figure 6:
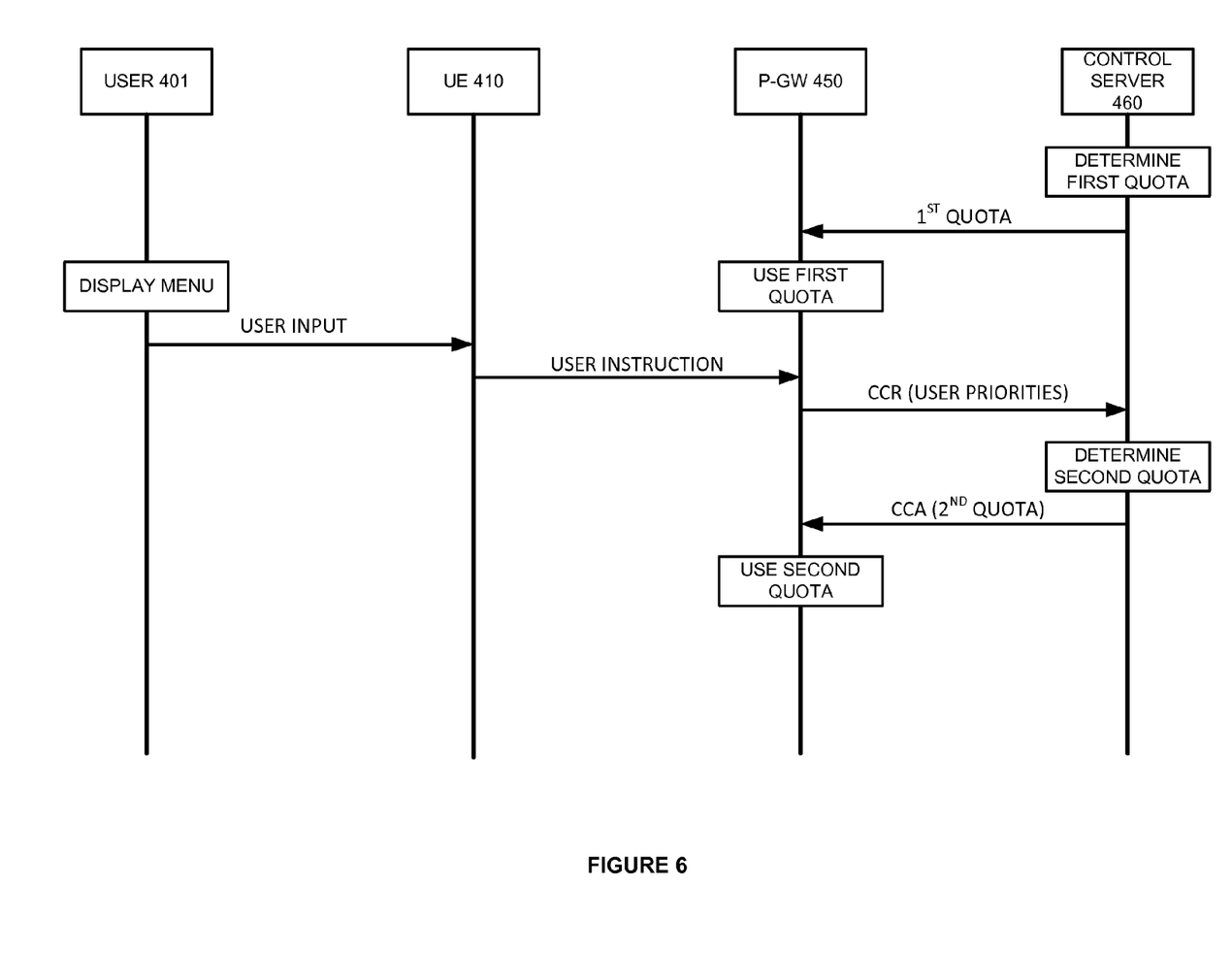
FIG. 6 illustrates the operation of the LTE network to control communication usage among a group of users that comprise a rating group.

FIG. 6 illustrates an alternative operation of LTE network 400 to control communication usage among users 401-402 in rating group 405. Communication control server 460 determines a first quota for rating group 405 and transfers a message indicating the first quota to P-GW 450. In response, P-GW 450 provides communication usage on an individual basis to users 401-402 in rating group 405 based on the first quota.

UE 410 displays a graphic user menu indicating one or more user priorities for selection. The display could be triggered based on a user device set-up, a notice from the network, a network registration, or some other communication event. Responsive to the graphical menu, UE 410 receives user inputs that prioritize the users, services, devices, and/or locations in rating group 405. Although the selection of user priorities is shown after the first quota in this example, this user-priority selection process may occur before the first quota is implemented in other examples. Also note that the selection of user-priorities may occur in response to an alert in control server 460, but the selection may occur without this prompt in other examples.

UE 410 transfers a user instruction indicating the user priorities to P-GW 450. P-GW 450 receives the user instruction and responsively transfers a CCR indicating the user priorities to control server 460. Communication control server 460 processes user priorities from the CCR to determine a second quota for rating group 405 based on the user priorities. The second quota controls the grants of subsequent communication usage on the per-user basis within rating group 405. In some examples, the second quota also indicates how much communication usage will be granted to individual users 401-402 on a per-service, per-device, and per-location basis. In response to the CCR indicating user priorities, communication control server 460 returns a CCA indicating the second quota to P-GW 450. P-GW 450 then grants subsequent communication usage to users 401-402 in rating group 405 based on the second quota in the CCA.

Note that the rating operations described above for P-GW 450 may be implemented by PCRF 451, S-GW 452, and/or eNodeBs 453 in other examples. In addition, these rating operations could be distributed across multiple systems, such as pairs of P-GWs or between a P-GW and a PCRF.

Figure 7:
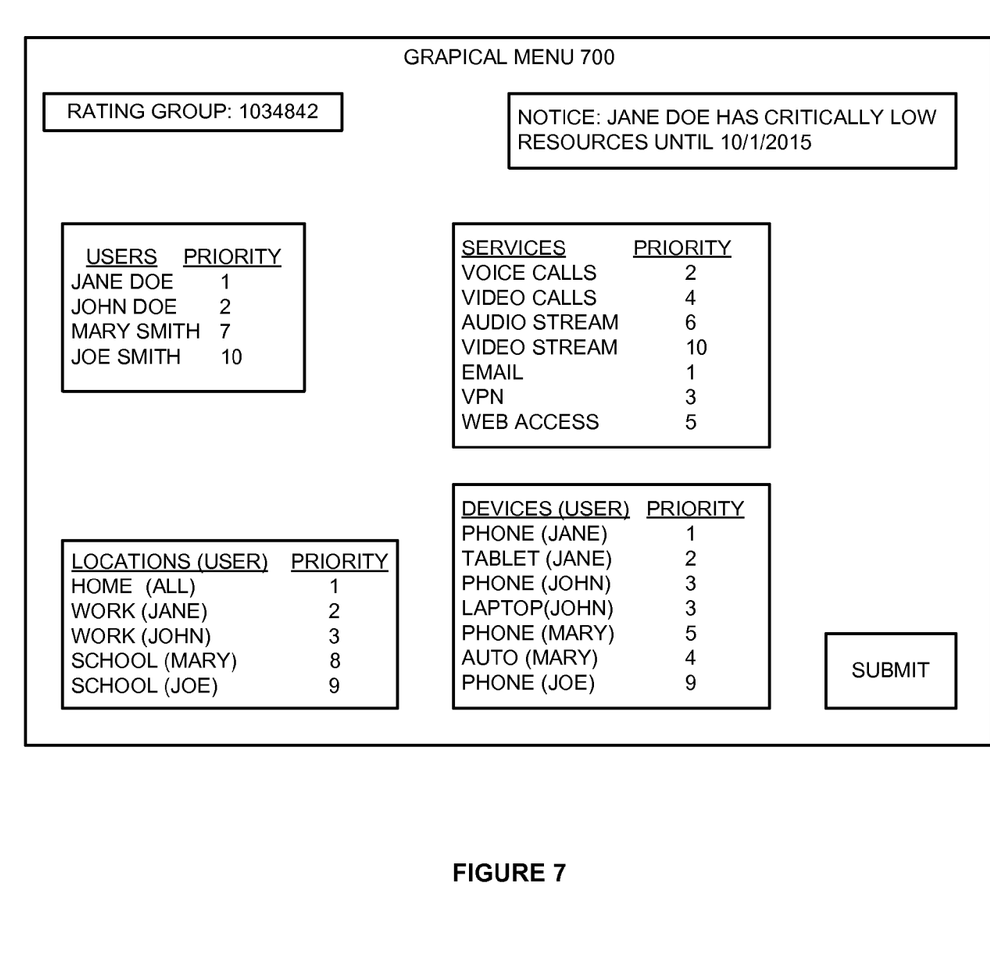
FIG. 7 illustrates a graphical display to allow a user to control communication usage in a rating group.

FIG. 7 illustrates an exemplary graphical menu 700 for display to a user to control communication usage among users in a rating group. Menu 700 lists various users and user devices in the rating group along with user-definable priorities using a scale from 1-10. Menu 700 also lists various services and locations in the rating group with additional user-definable priorities. Services include voice calling, video calling, video streaming, audio streaming, web browsing, email, virtual networking, and the like. Locations might include home and work locations for various users, although these may vary by example.

The priorities are used to reallocate the credits remaining for the rating group. Various rules could be used for this purpose. The priorities might correlate to percentages of remaining credit, so a high priority of 1 might receive 80% of remaining credits where a low priority of 10 gets 0% of remaining credits. The priorities may be sequenced by type where "user" priorities are used first to perform an initial allocation, and then other priorities (device, location, service) are used to adjust the initial priorities in a weighted fashion. Various allocation techniques could be used to translate the priorities into the allocations.

In some examples, combinations of these items could be selected and prioritized. For example, the user might select a given device and service combination (like their tablet computer device and an email service) to receive top priority in a communication resource reclamation from one quota to the next. In other examples, a combination, such as a location and a service could be given a lowest priority to shift resources to other uses. Thus, the combination of a home location and a video streaming service could be given the lowest priority in a communication resource reclamation from one quota to the next.

Figure 8:
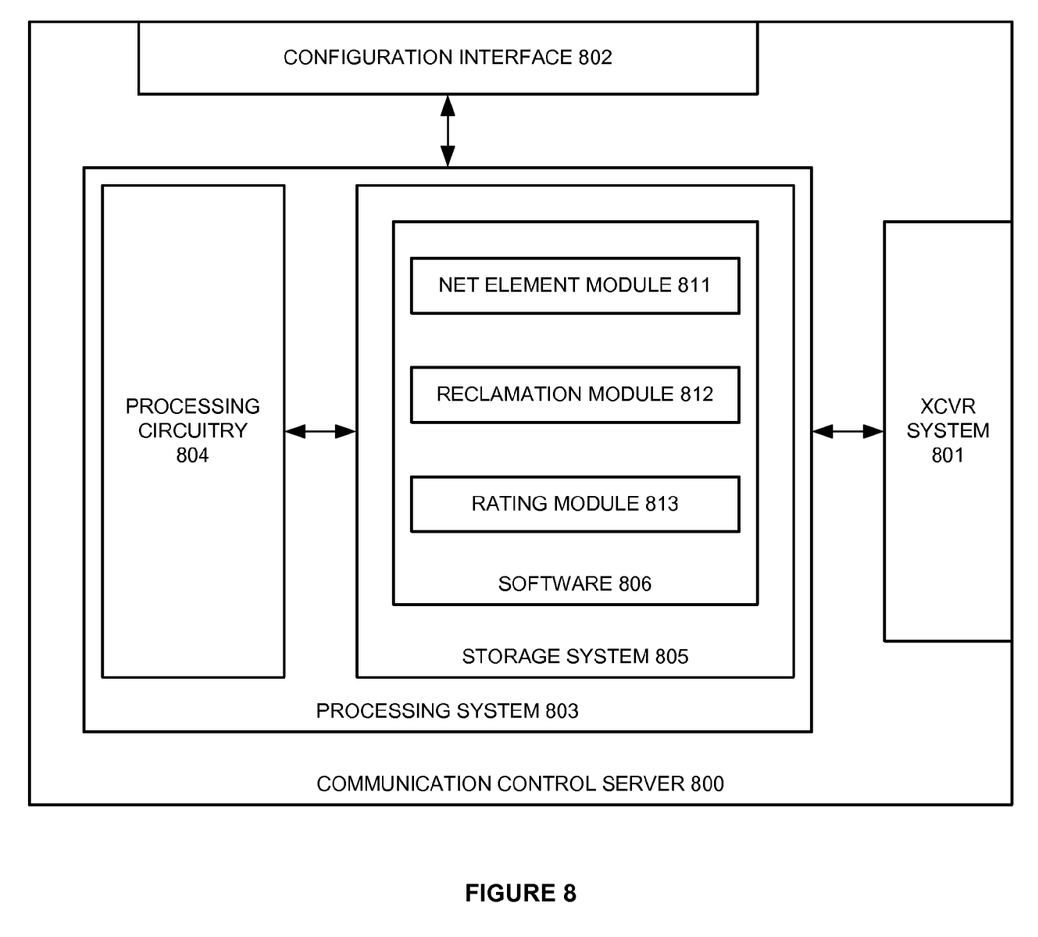
FIG. 8 illustrates a communication control server to control communication usage among a group of users that comprise a rating group.

FIG. 8 illustrates communication control server 800 to control communication usage among users in rating group. Communication control server 800 is an example of control servers 160 and 460, although these server systems may use alternative configurations and operations. Communication control server 800 comprises transceiver system 801, configuration interface 802, and processing system 803. Processing system 803 comprises processing circuitry 804 and storage system 805. Storage system 805 stores software 806. Communication control server 800 may be integrated within other systems and may be distributed across multiple diverse computer and communication systems. Some conventional aspects of communication control server 800 are omitted for clarity, such as power supplies, enclosures, and the like.

Transceiver system 801 comprises communication components, such as ports, circuitry, memory, software, and the like. Transceiver system 801 may use LTE and Diameter protocols, although other data protocols could be used. Transceiver system 801 receives user priorities and transfers quotas.

Configuration interface 802 comprises a programming interface to receive data, such as rating group information and instructions.

Processing circuitry 804 comprises circuit boards that hold integrated circuitry and associated electronics. Storage system 805 comprises non-transitory, machine-readable, data storage media, such as flash drives, disc drives, servers, memory circuitry, and the like. Software 806 comprises machine-readable instructions that control the operation of processing circuitry 804 when executed. Software 806 includes modules 811-813 and may also include operating systems, applications, utilities, databases, and the like. All or portions of software 806 may be externally stored on one or more storage media, such as flash drives, discs, servers, and the like.

When executed by processing circuitry 804, network element module 811 directs circuitry 804 to exchange messages, such RRAs and CCAs, with network elements as described herein. When executed by processing circuitry 804, reclamation module 812 directs circuitry 804 to process user priorities and other data to generate new quotas for rating groups as described herein. When executed by processing circuitry 804, rating module 813 directs circuitry 804 to track usage and detect potential problems, such as a nearly exhausted pool or rating group as described herein.

Figure 9:
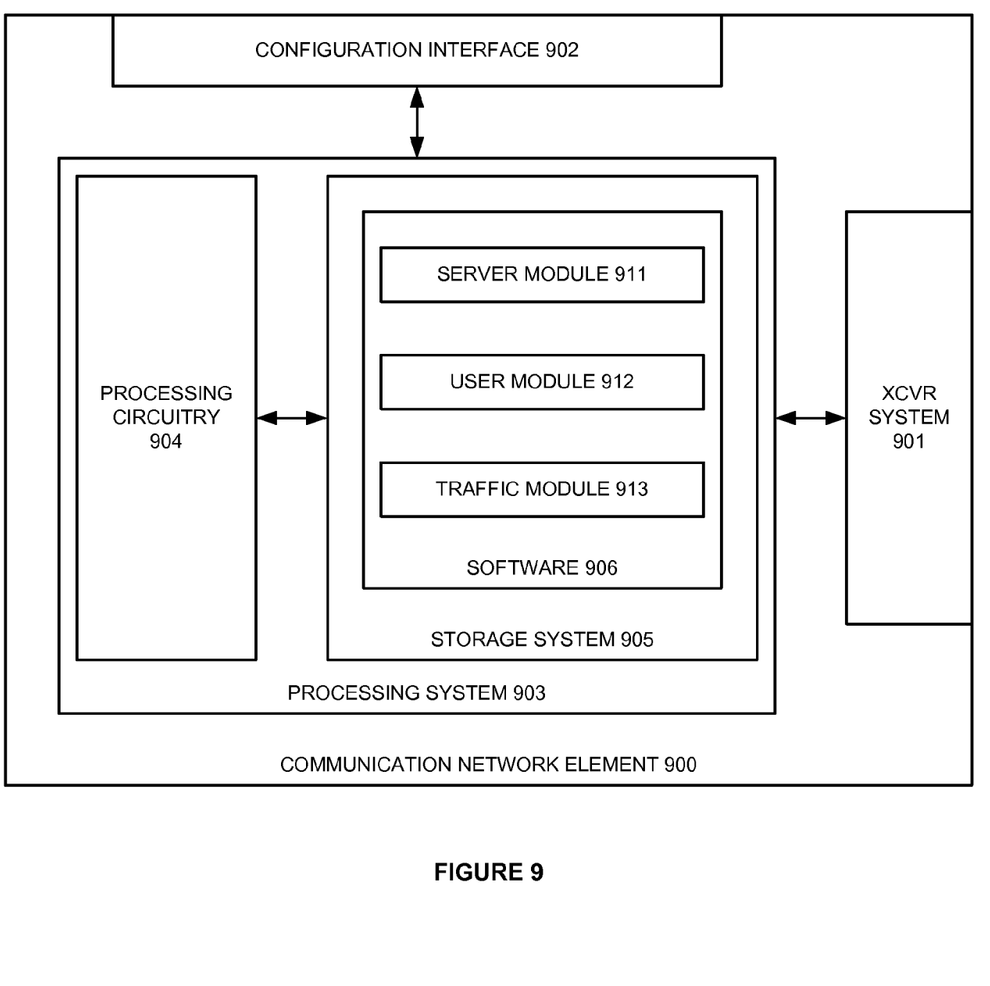
FIG. 9 illustrates a communication network element to control communication usage among a group of users that comprise a rating group.

FIG. 9 illustrates communication network element 900 to control communication usage among users in rating group. Communication network element 900 is an example of network elements 150 and 450, although these network element systems may use alternative configurations and operations. Communication network element 900 comprises transceiver system 901, configuration interface 902, and processing system 903. Processing system 903 comprises processing circuitry 904 and storage system 905. Storage system 905 stores software 906. Communication network element 900 may be integrated within other systems and may be distributed across multiple diverse computer and communication systems. Some conventional aspects of communication network element 900 are omitted for clarity, such as power supplies, enclosures, and the like.

Transceiver system 901 comprises communication components, such as ports, circuitry, memory, software, and the like. Transceiver system 901 typically uses LTE and IP protocols to carry user traffic, and system 901 may also use LTE and Diameter protocols to interact with the communication control server, although other data protocols could be used. Transceiver system 901 exchanges notices and user priorities with user devices and exchanges and user priorities and quotas with control servers.

Configuration interface 902 comprises a programming interface to receive data, such as user traffic processing instructions.

Processing circuitry 904 comprises circuit boards that hold integrated circuitry and associated electronics. Storage system 905 comprises non-transitory, machine-readable, data storage media, such as flash drives, disc drives, servers, memory circuitry, and the like. Software 906 comprises machine-readable instructions that control the operation of processing circuitry 904 when executed. Software 906 includes modules 911-913 and may also include operating systems, applications, utilities, databases, and the like. All or portions of software 906 may be externally stored on one or more storage media, such as flash drives, discs, servers, and the like.

When executed by processing circuitry 904, server module 911 directs circuitry 904 to exchange messages, such RRAs and CCAs, with control servers as described herein. When executed by processing circuitry 904, user module 912 directs circuitry 904 to exchange notices and user priorities with user devices as described herein. When executed by processing circuitry 904, traffic module 913 directs circuitry 904 to handle user traffic as described herein.

Figure 10:
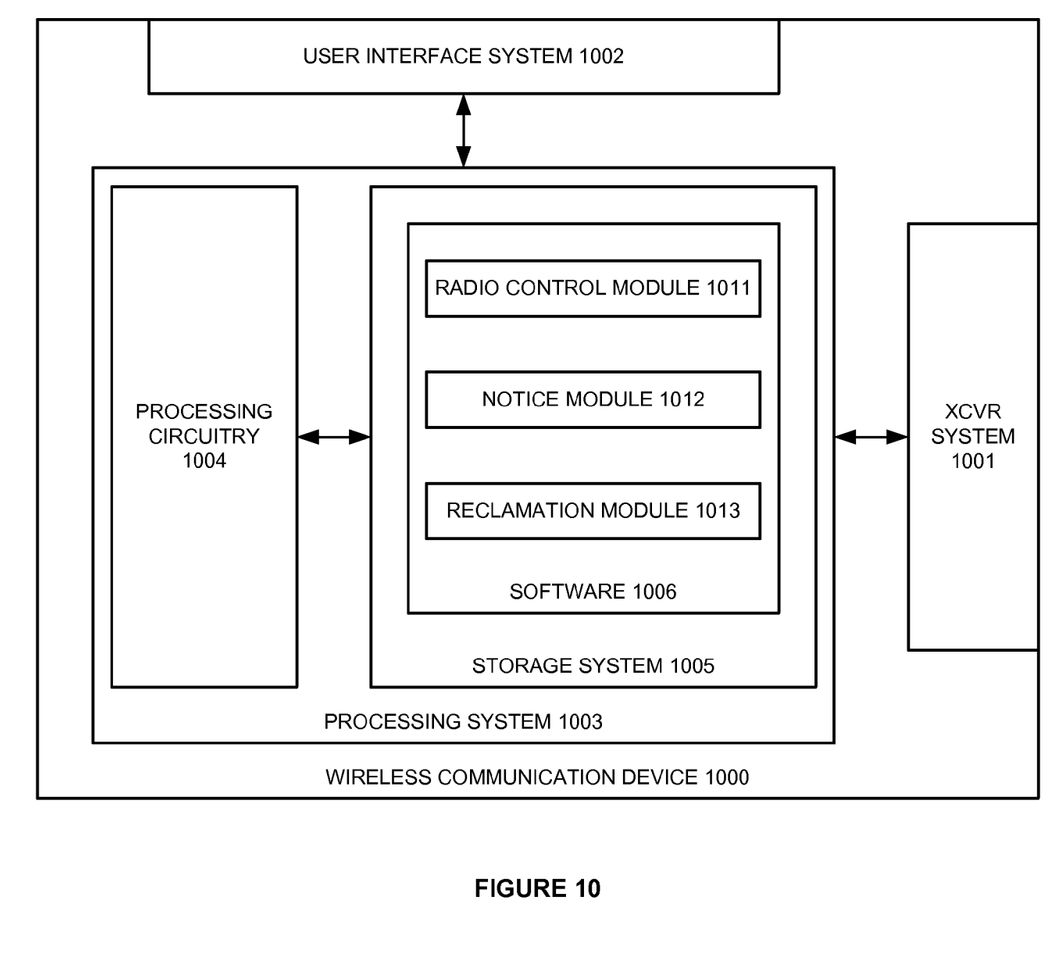
FIG. 10 illustrates the wireless communication device to control communication usage among a group of users that comprise a rating group.

FIG. 10 illustrates wireless communication device 1000 to control communication usage among users in rating group.

Wireless communication device 1000 is an example of the wireless communication device 110 and UE 410, although these devices may use alternative configurations. Wireless communication device 1000 comprises transceiver system 1001, user interface system 1002, and processing system 1003. Processing system 1003 comprises processing circuitry 1004 and storage system 1005. Storage system 1005 stores software 1006. Wireless communication device 1000 may be integrated within other systems and may be distributed across multiple diverse computer and communication systems. Some conventional aspects of wireless communication device 1000 are omitted for clarity, such as power supplies, enclosures, and the like.

Transceiver system 1001 comprises communication components, such as antennas, ports, filters, amplifiers, circuitry, memory, software, and the like. Transceiver system 1001 uses protocols such as such as Long Term Evolution (LTE), Code Division Multiple Access (CDMA), Global System for Mobile communications (GSM), Evolution Data Optimized (EVDO), High Speed Packet Access (HSPA), enhanced High Rate Packet Data (eHRPD), evolved High Speed Packet Access (eHSPA), Wireless Fidelity (WiFi), or some other communication format. Transceiver system 1001 receives notices and transfer user priorities as described herein.

User interface system 1002 comprises displays, touchscreens, speakers, microphones, vibrators, switches, buttons, lights, and/or some other human-to-machine interfaces. User interface system 1002 receives notices for display to the user, provides menus for user priority selection, and receives user inputs indicating selected priorities.

Processing circuitry 1004 comprises circuit boards that hold integrated circuitry and associated electronics. Storage system 1005 comprises non-transitory, machine-readable, data storage media, such as flash drives, disc drives, memory circuitry, and the like. Software 1006 comprises machine-readable instructions that control the operation of processing circuitry 1004 when executed. Software 1006 includes modules 1011-1013 and may also include operating systems, applications, utilities, databases, and the like. All or portions of software 1006 may be externally stored on one or more storage media, such as flash drives, discs, servers, and the like.

When executed by processing circuitry 1004, radio control module 1011 directs circuitry 1004 to communicate over various networks as described herein. When executed by processing circuitry 1004, notice module 1012 directs circuitry 1004 to receive and present network data as described herein. When executed by processing circuitry 1004, reclamation module 1013 directs circuitry 1004 to obtain and transfer user priorities as described herein.

Referring back to FIG. 1, communication system 100 typically includes additional network elements and links that are omitted for clarity. Communication system 100 may comprise wireless networks, data networks, data centers, and the like. Links 130-132 and 151 comprise communication media such as air, metal, glass, plastic, and the like—including combinations thereof. Links 130-132 and 151 use various communication protocols, such as LTE, EVDO, HSPA, DOCSYS, IP, Ethernet, TDM, SONET, WDM, WiFi, Diameter, RADIUS, and the like—including combinations thereof. Links 130-132 and 151 may also comprise intermediate network elements and systems that are omitted for clarity.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to facilitate communications for a rating group having a plurality of users, the method comprising:
   in a communication control server, determining a first quota for the rating group to grant communication usage on a per-user basis within the rating group and transferring a message indicating the first quota for delivery to a communication network element;
   in the communication network element, receiving the message and responsively granting the communication usage to the users in the rating group based on the first quota;
   in a user communication device, receiving a user input indicating a user priority and responsively transferring a user instruction indicating the user priority for delivery to the communication network element;
   in the communication network element, receiving the user instruction and responsively transferring a user request indicating the user priority for delivery to the communication control server;
   in the communication control server, receiving and processing the user request to determine a second quota for the rating group based on the user priority to grant subsequent communication usage on the per-user basis within the rating group and transferring a user answer indicating the second quota for delivery to the communication network element;
   in the communication network element, receiving the user answer and granting the subsequent communication usage to the users in the rating group based on the second quota.

2. The method of claim 1 further comprising:
   in the control server, determining a communication problem for the rating group and transferring an alert indicating the problem for delivery to the communication network element;
   in the communication network element, receiving the alert and responsively transferring a notice for delivery to the user communication device;
   in the user communication device, receiving and presenting the notice, wherein receiving the user input indicating the user priority comprises receiving the user input indicating the user priority in response to presenting the notice.

3. The method of claim 1 further comprising:
   in the communication control server, transferring a Re-Authorization Request (RAR) for delivery to the communication network element;
   in the communication network element, receiving the RAR and responsively transferring a notice for delivery to the user communication device; and
   wherein transferring the user request indicating the user priority for delivery to the communication control server comprises, in the network element, transferring a Re-Authorization Answer (RAA) indicating the user priority for delivery to the communication control server.

4. The method of claim 1 further wherein:
   in the communication network element, transferring the user request indicating the user priority comprises transferring a Credit Control Request (CCR) indicating the user priority;

in the communication control server, transferring the user answer indicating the second quota comprises transferring a Credit Control Answer (CCA) indicating the second quota.

5. The method of claim 1 wherein:
the user priority indicates one of the users; and
processing the user request to determine the second quota based on the user priority comprises transferring communication resources from other ones of the users to the one user.

6. The method of claim 1 wherein:
the user priority indicates the user communication device; and
processing the user request to determine the second quota based on the user priority comprises transferring communication resources from other communication devices to the user communication device.

7. The method of claim 1 wherein:
the user priority indicates a communication service; and
processing the user request to determine the second quota based on the user priority comprises transferring communication resources from other communication services to the one communication service.

8. The method of claim 1 wherein:
the user priority indicates a geographic area; and
processing the user request to determine the second quota based on the user priority comprises transferring communication resources from other geographic areas to the one geographic area.

9. The method of claim 1 wherein:
the user priority indicates one of the users and a communication service; and
processing the user request to determine the second quota based on the user priority comprises transferring communication resources from other ones of the users and other communication services to the one user for the one communication service.

10. The method of claim 1 wherein:
the user priority indicates the user communication device and a communication service; and
processing the user request to determine the second quota based on the user priority comprises transferring communication resources from other communication devices and other communication services to the user communication device for the one communication service.

11. A communication system to facilitate communications for a rating group having a plurality of users comprising:
a communication control server configured to determine a first quota for the rating group to grant communication usage on a per-user basis within the rating group and transfer a message indicating the first quota for delivery to a communication network element;
the communication network element configured to receive the message and responsively grant the communication usage to the users in the rating group based on the first quota;
a user communication device configured to receive a user input indicating a user priority and responsively transfer a user instruction indicating the user priority for delivery to the communication network element;
the communication network element configured to receive the user instruction and responsively transfer a user request indicating the user priority for delivery to the communication control server;
the communication control server configured to receive and process the user request to determine a second quota for the rating group based on the user priority to grant subsequent communication usage on the per-user basis within the rating group and transfer a user answer indicating the second quota for delivery to the communication network element;
the communication network element configured to receive the user answer and grant the subsequent communication usage to the users in the rating group based on the second quota.

12. The communication system of claim 11 wherein:
the communication control server is configured to determine a communication problem for the rating group and transfer an alert indicating the problem for delivery to the communication network element;
the communication network element is configured to receive the alert and responsively transfer a notice for delivery to the user communication device;
the user communication device is configured to receive and present the notice and receive the user input indicating the user priority in response to presenting the notice.

13. The communication system of claim 11 wherein:
the communication control server is configured to transfer a Re-Authorization Request (RAR) for delivery to the communication network element;
the communication network element is configured to receive the RAR and responsively transfer a notice for delivery to the user communication device, and to transfer a Re-Authorization Answer (RAA) indicating the user priority for delivery to the communication control server.

14. The communication system of claim 11 further wherein:
the communication network element is configured to transfer a Credit Control Request (CCR) indicating the user priority;
the communication control server is configured to transfer a Credit Control Answer (CCA) indicating the second quota.

15. The communication system of claim 11 wherein:
the user priority indicates one of the users; and
the communication control server is configured to process the user request to determine the second quota to transfer communication resources from other ones of the users to the one user.

16. The communication system of claim 11 wherein:
the user priority indicates the user communication device; and
the communication control server is configured to process the user request to determine the second to transfer communication resources from other communication devices to the user communication device.

17. The communication system of claim 11 wherein:
the user priority indicates a communication service; and
the communication control server is configured to process the user request to determine the second quota to transfer communication resources from other communication services to the one communication service.

18. The communication system of claim 11 wherein:
the user priority indicates a geographic area; and
the communication control server is configured to process the user request to determine the second quota to transfer communication resources from other geographic areas to the one geographic area.

19. The communication system of claim 11 wherein:
the user priority indicates one of the users and a communication service; and the communication control server is configured to process the user request to determine the second quota to transfer communication resources from other ones of the users and other communication services to the one user for the one communication service.

20. The communication system of claim 11 wherein:

the user priority indicates the user communication device and a communication service; and the communication control server is configured to process the user request to determine the second quota to transfer communication resources from other communication devices and other communication services to the user communication device for the one communication service.

\* \* \* \* \*